(12) United States Patent
Kolbe et al.

(10) Patent No.: US 7,569,624 B2
(45) Date of Patent: Aug. 4, 2009

(54) CURABLE BONDED ASSEMBLIES CAPABLE OF BEING DISSOCIATED

(75) Inventors: Jana Kolbe, Bremen (DE); Thomas Kowalik, Bremen (DE); Matthias Popp, Bremen (DE); Monika Sebald, Bremen (DE); Oliver Schorsch, Bremen (DE); Stefan Heberer, Gelnhausen (DE); Markus Pridoehl, Grosskrotzenburg (DE); Guido Zimmermann, Hanau (DE); Andreas Hartwig, Ritterhude (DE); Erwin Born, Bremen (DE)

(73) Assignees: Degussa AG, Duesseldorf (DE); Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 223 days.

(21) Appl. No.: 10/492,201

(22) PCT Filed: Nov. 12, 2002

(86) PCT No.: PCT/EP02/12610
§ 371 (c)(1),
(2), (4) Date: Apr. 21, 2004

(87) PCT Pub. No.: WO03/042315
PCT Pub. Date: May 22, 2003

(65) Prior Publication Data
US 2004/0249037 A1    Dec. 9, 2004

(30) Foreign Application Priority Data
Nov. 13, 2001  (DE) ................. 101 55 614
Mar. 12, 2002  (DE) ................. 102 10 661

(51) Int. Cl.
    *C08K 5/04*    (2006.01)
(52) U.S. Cl. ..................... 523/200; 523/210
(58) Field of Classification Search ................. 523/200, 523/210; 524/394, 442
    See application file for complete search history.

(56) References Cited

U.S. PATENT DOCUMENTS

| 6,183,658 | B1 * | 2/2001 | Lesniak et al. ........... 252/62.56 |
| 6,586,483 | B2 * | 7/2003 | Kolb et al. ..................... 521/91 |
| 6,746,767 | B2 | 6/2004 | Gottfried et al. |
| 6,761,747 | B2 | 7/2004 | Gottfried et al. |
| 6,855,760 | B1 * | 2/2005 | Kirsten et al. ............... 524/394 |
| 7,147,742 | B2 * | 12/2006 | Kirsten ..................... 156/272.2 |
| 7,235,298 | B2 | 6/2007 | Katusic et al. |
| 7,371,337 | B2 | 5/2008 | Katusic et al. |
| 2003/0031438 | A1 * | 2/2003 | Kambe et al. ............... 385/122 |
| 2004/0014860 | A1 * | 1/2004 | Meier et al. ................. 524/394 |
| 2004/0249037 | A1 | 12/2004 | Kolbe et al. |
| 2006/0216441 | A1 | 9/2006 | Schubel et al. |
| 2006/0281846 | A1 | 12/2006 | Hager et al. |
| 2007/0094757 | A1 | 4/2007 | Pridohl et al. |
| 2007/0149395 | A1 | 6/2007 | Kroell et al. |
| 2007/0172406 | A1 | 7/2007 | Pridoehl et al. |
| 2007/0172415 | A1 | 7/2007 | Zimmermann et al. |
| 2007/0173581 | A1 | 7/2007 | Hager et al. |
| 2007/0183918 | A1 | 8/2007 | Monsheimer et al. |
| 2007/0199477 | A1 | 8/2007 | Hill et al. |
| 2008/0161469 | A1 | 7/2008 | Hoss et al. |

FOREIGN PATENT DOCUMENTS

| JP | 11-302614 | 11/1999 |
| WO | 9738058 | 10/1997 |
| WO | 0130932 | 5/2001 |
| WO | 0213580 | 2/2002 |

OTHER PUBLICATIONS

U.S. Appl. No. 11/574,254, filed Feb. 26, 2007, Pridoehl, et al.
U.S. Appl. No. 11/720,613, filed Jun. 1, 2007, Pridoehl, et al.

* cited by examiner

*Primary Examiner*—Katarzyna Wyrozebski
(74) *Attorney, Agent, or Firm*—Oblon, Spivak, McClelland, Maier & Neustadt, P.C.

(57) ABSTRACT

The invention concerns an adhesive composition for producing thermoset products, capable of being heated by means of an electric field, a magnetic field, an electromagnetic field or an alternating electromagnetic field, and containing filler particles which are metallic, ferromagnetic, ferrimagnetic, superparamagnetic or paramagnetic. Said adhesive composition can be hardened under the action of heat to form a high-resistance stable adhesive assembly, said resulting adhesive assemblies capable of being likewise dissociated under the action of heat.

20 Claims, 2 Drawing Sheets

CURABLE BONDED ASSEMBLIES CAPABLE OF BEING DISSOCIATED

CROSS REFERENCE TO RELATED APPLICATIONS

This application is the U.S. national stage of International Patent Application No. PCT/EP02/12610, filed Nov. 12, 2002. This application claims priority to German Patent Applications No. 101 55 614.4, filed Nov. 13, 2001, and No. 101 10 661.4, filed Mar. 12, 2002.

BACKGROUND

The present invention relates to an adhesive composition according to the pre-characterising part of the main claim, which contains inductively heatable filler particles, and to its use and a process for its curing. The invention also relates to an adhesive composite that contains a hardened layer of the adhesive composition, a process for the thermal dissociation of the hardened adhesive composition, and the use of this process.

Adhesive bonds, i.e. in particular bonded joints, coatings, laminates or cast structural parts are designed so that they can be produced under mild conditions, are resistant for as long as possible and have the highest possible strengths. High strengths mean that, in the case of a repair or recycling, a dissociation of the adhesive bond can be carried out only under extreme conditions, such as for example the action of strong forces or high temperatures. Bonded joints based on hard adhesives are generally dissociable, but are not suitable for transmitting the high forces necessary for structural bonded joints. The dissociation of high-strength bonded joints is generally accomplished by the use of mechanical energy or chemical agents. The latter have the disadvantage that they cause a high environmental pollution and also that the penetration of the agents into the gluelines of structural bonded joints that are stable over the long term takes far too long.

DE 43 28 108 A describes the dissociation of floor coverings by means of microwave energy. For this purpose a contact adhesive is used that is electrically conducting and is filled with copper powder or aluminium powder. These fillers have the disadvantage that the particles have sizes of a few micrometers and larger. This leads to a non-uniform heating of the contact adhesive.

DE 199 61 940 A1 describes adhesives for dissociable bonded joints that contain thermally activatable substances that release gaseous compounds when they decompose, which then destroy the bonded joints. This process has the disadvantage that in order to separate the composite, the whole structural part or the joined parts and the adhesive have to be heated. This is associated with a high energy expenditure. Furthermore it is not possible to achieve a locally restricted separation of the structural part or of the joined part.

DE 199 51 599 A1 and DE 199 24 138 A1 describe adhesives for dissociable bonded joints and bonded joints produced therewith, that contain externally excitable nanofillers. The dissociation of the bonded joints is achieved by introducing the joints into an alternating electrical, magnetic or electromagnetic field, whereby the nanofillers and the surrounding adhesive are heated. This process has the disadvantage however that it leads to the heating of the whole adhesive, also at places at which no heating is necessary or desirable, since the excitable nanofillers are also contained in places in the adhesive or primer where heating is not necessary in order to achieve the desired dissociation of the bonded joint. Furthermore high temperatures are required to separate high-strength bonded joints since chemical bonds have to be broken in order to break down the composite. The described processes furthermore have the disadvantage that a non-specific thermal decomposition of the adhesive and/or primer occurs when separating high-strength bonded joints. Such processes are therefore unsuitable in particular for thermosets.

The production of resistant, high-strength adhesive joints is normally carried out thermally or photochemically. The conventional processes for producing adhesive bonded joints have the disadvantage however that the whole structural part has to be heated in order to cure the adhesive. As a result the process is energy intensive and time-consuming.

WO 99/03306 and O. Hahn, A. Kaimann in Adhäsion—Kleben und Dichten, 10/2001, pp. 35-38 describe a process for the inductive curing of adhesive joints. In this case adhesives that contain inductively activatable fillers are introduced into an electromagnetic field, whereby the inductively activatable fillers are heated and the hardening of the adhesive surrounding the fillers can take place. These processes have the disadvantage however that the inductively activatable substances are not uniformly distributed over the adhesive and accordingly there is an inhomogeneous heating of the adhesive. As a result, the strength of such adhesive joints is limited. The processes furthermore have the disadvantage that a demixing (separation) may occur in the adhesive during the inductive heating process and the distribution of the thermally activatable substances in the adhesive becomes even more irregular.

SUMMARY

The object of the present invention is to overcome the disadvantages of the prior art and to provide an adhesive composition that can be hardened under mild conditions to form a resistant, high-strength adhesive joint. A further object of the present invention is to provide a process for dissociating such adhesive joints without the long-term resistance of the adhesive joint inevitably suffering thereby.

These objects are achieved by the adhesive composition according to claims 1 and 11, the process for their curing according to claim 18, the adhesive composite according to claim 19 and the process for the thermal dissociation of the hardened adhesive composition according to claims 22 and 23. Claims 17 and 24 specify uses of the adhesive composition and of the process for dissociating the hardened adhesive composition. The subclaims disclose advantageous modifications.

It was found that adhesive compositions that contain a polymer, a polymer mixture or a reaction resin, as well as particles of crosslinking agent, can be heated by means of an electrical field, magnetic field, electromagnetic field, alternating electrical field, alternating magnetic field or alternating electromagnetic field. The particles of crosslinking agent consist in this connection of filler particles that are metallic, ferromagnetic, ferrimagnetic, superparamagnetic or paramagnetic, as well as crosslinking agent units that are chemically bound to the filler particles.

A chemical reaction between the crosslinking agent unit and the polymer or the polymer mixture is triggered by inductive heating of the particles of crosslinking agent, whereby a polymer network is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Adhesive compositions within the meaning of the present invention include in particular adhesives, paints, primers, casting compositions, sealants and laminating resins. In particular bonded joints, painted structural parts or structural parts provided with a primer, cast structural parts, sealed structural parts or polymer laminates are thereby formed by curing these adhesive compositions. As polymers, polymer mixtures and reaction resins within the meaning of the present invention there may be used all polymers, polymer mixtures and reaction resins that are considered suitable for the aforementioned applications. Preferred are crosslinked polymers, particularly preferably polymers or reaction resins from which structural or semi-structural joints can be produced. In particular epoxide resins, polyurethanes, acrylates, phenol resins, polysulfides or melamine resins are suitable. According to the invention the filler particles are chemically bound to the crosslinking agent component. This chemical bonding may be of an ionic, co-ordinative or covalent nature. Van-der-Waals interactions for example are also included under this heading.

In order to produce the chemical bonds according to the invention it is advantageous if the surfaces of the filler particles are surface-modified, i.e. if they carry functional groups on their surface that can readily react with functional groups of the crosslinking agent unit. The crosslinking agent unit for its part carries at least one functional group that on heating can undergo crosslinking reactions with the polymer, the polymer mixture or the reactive resin. The heating may in this connection be accomplished either inductively or also in a conventional way. Suitable functional groups that undergo crosslinking reactions include for example epoxide, amino, thiol, alcohol, acrylate, methacrylate or vinyl groups.

Chemical groups bound to the crosslinking agent unit that can react with the filler surface are in particular alkoxysilanes, alkoxy titanates and alkoxy zirconates. These lead to a bonding to the normally metallic or oxidic surface of the filler particles.

Figure 1A:
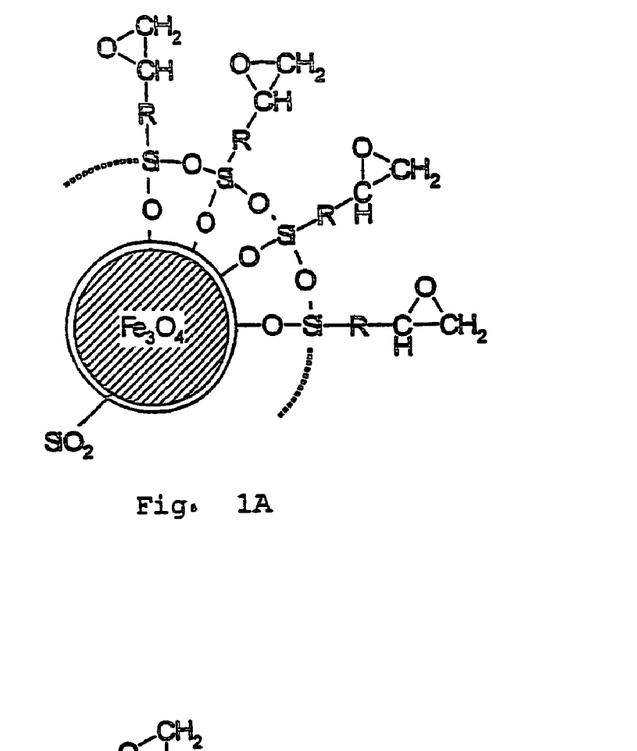
FIG. 1A is a diagrammatic depiction of an exemplary individual crosslinking agent particle with epoxide groups.
Figure 1B:
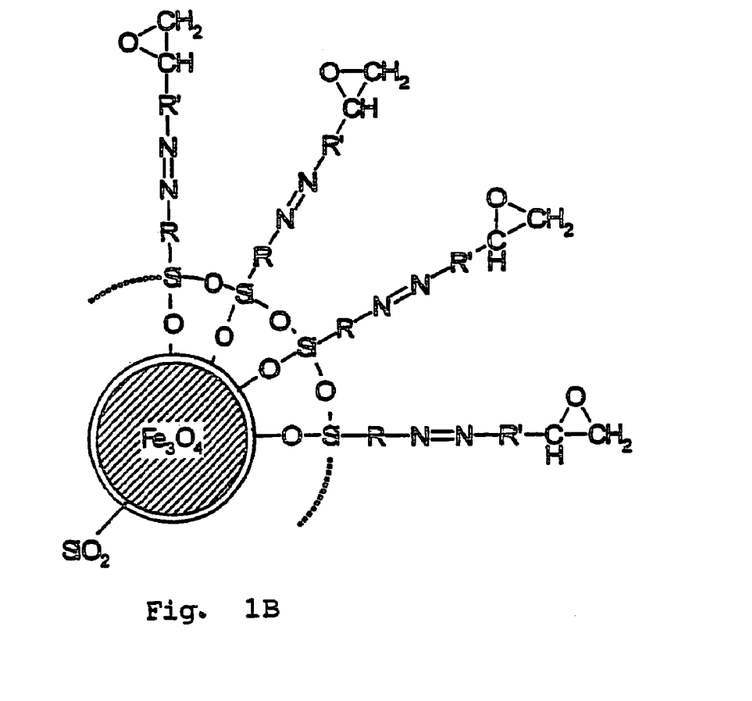
FIG. 1B is a diagrammatic depiction of an exemplary individual crosslinking agent particle with crosslinking agent units bound via a thermally labile group.

Filler particles consisting of inductively excitable materials in the interior of the particles as well as of a particle surface predominantly of silicon dioxide are particularly preferred. They may be used in spherical or aggregated form. The predominantly spherical filler particles with a core-shell structure (see FIG. 1A, FIG. 2A) can be obtained for example via sol-gel processes or from the reaction of nanoscale iron oxide with sodium silicate; the aggregated filler particles with a silicon dioxide surface (FIG. 1B, FIG. 2B) are preferably obtained by means of gas phase synthesis. These particles are hereinafter termed composite particles. These composite particles consist of aggregates that exhibit the characteristic "sinter neck"; multiple inclusions or domains of the inductively excitable material are found distributed in the interior of the aggregates, while on the surface the composite particles consist largely of silicon dioxide.

Particles with silicon dioxide on the surface have a high long-term resistance, with respect to moisture, of the bond between the crosslinking agent unit and the filler particle surface and react rapidly with the aforementioned chemical groups. Furthermore, the silicon dioxide layer protects the inductively excitable components against chemical attack by constituents of the formulation.

Figure 2A:
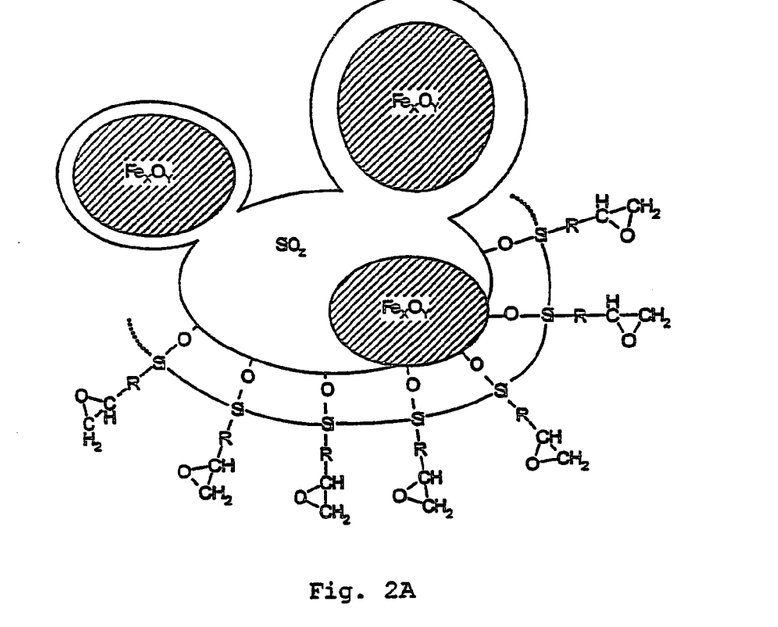
FIG. 2A is a diagrammatic depiction of an exemplary agglomerated crosslinking agent particle with epoxide groups.
Figure 2B:
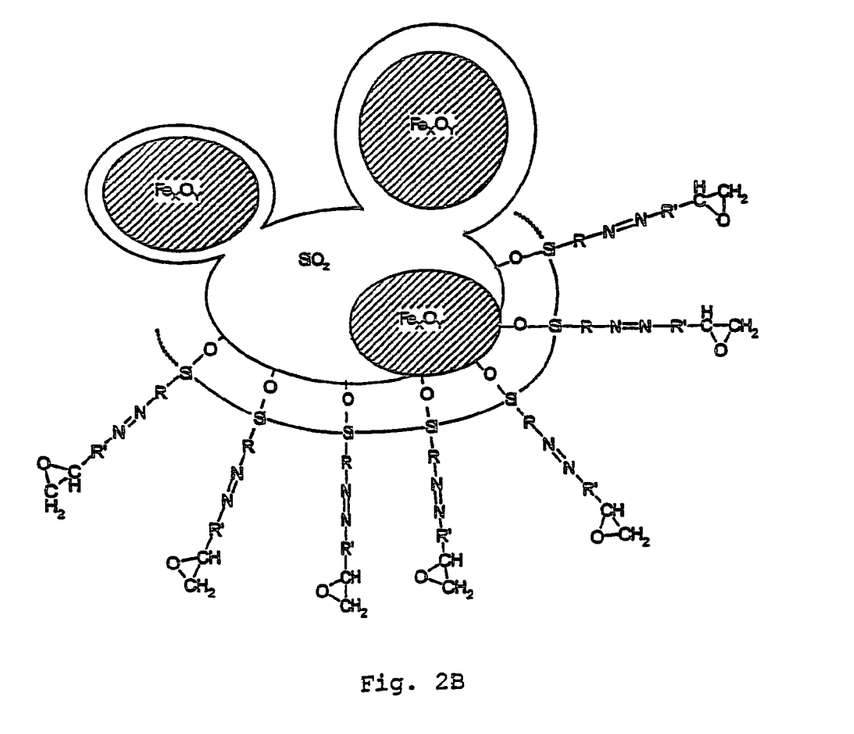
FIG. 2B is a diagrammatic depiction of an exemplary agglomerated crosslinking agent particle with crosslinking agent units bound via a thermally labile group.

The crosslinking agent particles according to the invention can be used for example as crosslinking agents for epoxide resins. This epoxide resin may for example be a bisphenol A diglycidyl ether hardened with a diamine. By using such crosslinking agent particles a thermoset is obtained that can be subjected to high chemical and thermal stress. An individual crosslinking agent particle with epoxide groups is shown diagrammatically by way of example in FIG. 1A. The filler particles may also be present in the form of agglomerates, as shown in FIG. 2A. FIG. 2A shows diagrammatically a section from an agglomerate of iron oxide particles in a silicon dioxide matrix.

The adhesive compositions according to the invention have the advantage that the distribution of the filler particles is such that they are located only at those places where their action is necessary, namely in the crosslinking agent particles. Compared to the previously known adhesive compositions, the filler particles are in this case in direct (i.e. molecular or almost molecular) contact at those places at which their effect is to be manifested. In this way a non-specific heating of the whole polymer is avoided during inductive heating. The adhesive compositions according to the invention may therefore be inductively hardened under mild conditions.

In addition the adhesive compositions according to the invention have the advantage that adhesive joints produced therefrom can also be inductively and cleanly re-separated, with savings in time and energy, without having to add substances that facilitate a separation. Here too the heating takes place selectively on a molecular level at the site at which the bonds are to be broken. This has the advantage that the whole polymer is not destroyed, as would be the case for example if it were heated with a welding torch or laser. A non-selective thermal decomposition of the polymer can thereby be avoided.

Naturally, a lower induction output, i.e. for example a lower output of the high-frequency generator, is necessary for the crosslinking or curing than for the separation of the adhesive joint.

According to the invention, in particular adhesive compositions are suitable that have a content of crosslinking agent particles of 0.1 to 80%, preferably 0.5 to 40% and particularly preferably 1% to 30%. By increasing the content of crosslinking agent particles or crosslinking agent units, a higher degree of crosslinking and thus a higher strength is achieved.

Advantageously the crosslinking agent particles have an average primary particle size, i.e. an average primary particles diameter, of less than 1000 nm, preferably less than 500 nm and particularly preferably between 2 nm and 100 nm. A uniform crosslinking of the adhesive composition according to the invention is achieved in this way. Furthermore, such small particle sizes are most suitable from the point of view of energy economy.

The filler particles according to the invention may be present in an agglomerated state if the dispersion quality is insufficient. The crosslinking agent particles preferably comprise at least three functional groups having a crosslinking action, a thermoset thereby being formed. A thermoset is then generally obtained if three chemical groups (polymer systems curing by polycondensation or by polyaddition) or possibly even two chemical groups (polymer systems curing by polymerisation) are bound to the crosslinking agent. According to the invention adhesive compositions with crosslinking agent particles that have, referred to their surface, at least 0.00001 mmole×m$^{-2}$ functional groups having a crosslinking action, are preferred. Typically the density of the groups having a crosslinking action is in the range from 0.1 to 1 mmole per 100 m$^2$ of specific surface of the crosslinking agent particle. The crosslinking agent particles according to the invention consequently form after the curing reaction a stellate crosslinking centre in the polymer network. If the functional groups on the crosslinking agent units are for example epoxide groups, then these may be employed with BF$_3$ etherate as curing catalyst for crosslinking monofunctional epoxide resins. After curing, a thermoset is then formed; without the crosslinking agent particles according to the invention only a linear polymer capable of withstanding slight stress would be formed.

The adhesive compositions according to the invention preferably contain filler particles that are surface-modified and are selected from the group comprising iron, iron alloys and iron-containing metal oxides. Suitable for example are filler particles that are based on iron powder, magnetite powder, superparamagnetic iron oxide or manganese-zinc-iron oxide. For example, nanoscale magnetite powder with a silicon dioxide shell may be surface-modified or functionalised with epoxide groups by reaction with 3-glycidoxypropyltrimethoxysilane. If a sol-gel process is used a reaction with an epoxysilane may at the same time also take place, which means that a reaction step can be omitted. However, another functional silane may also be used for a one-stage or two-stage surface modification. The functional groups of the silane are in this connection chosen so that they can react with the polymer system to be crosslinked. Suitable pairs of functional groups of the crosslinking agent component and of the polymer system are for example the pairs listed in DE 197 33 643 A1, page 4. For example, a thermoset based on isocyanate prepolymers is obtained if the crosslinking agent particles according to the invention are surface-modified with aminopropyltrimethoxysilane. By reacting the amino groups with the dimeric isocyanate, urea couplings are formed as crosslinking sites. In the case of acrylate resins the modification of the crosslinking agent particles is preferably carried out with silanes containing acrylate or methacrylate groups, and in the case of mercaptans is preferably carried out with epoxysilanes.

Particularly preferred are adhesive compositions with filler particles that have been produced by flame pyrolysis.

Such filler particles may be particles or aggregated particles with superparamagnetic iron oxide domains having a diameter of 3 to 20 nm in a silicon dioxide matrix. The production of such particles is described for example by Zachariah et al. in Nanostructured Materials 5, 383 (1995) or Ehrman et al. in Journal of Materials Research 14, 4551 (1999).

Particularly preferred are the iron oxide-silicon dioxide composite particles described in DE 10140089.6 of application date 16 Aug. 2001.

Filler particle domains are understood to be superparamagnetic regions spatially separated from one another. On account of the flame pyrolysis process these particles are largely pore-free and contain free hydroxyl groups on the surface. They exhibit superparamagnetic properties when an external magnetic field is applied. The proportion of superparamagnetic iron oxide domains of the filler particles may lie between 1 and 99.6 wt. %. Regions of superparamagnetic iron oxide domains spatially separated by the non-magnetic matrix are present in this range. The range with a proportion of superparamagnetic domains greater than 30 wt. %, particularly preferably greater than 50 wt. %, is preferred. The achievable magnetic effect of the particles according to the invention also increases in step with the proportion of the superparamagnetic regions.

In these domains the iron oxide may be present in a uniform modification or in different modifications.

In addition regions of non-magnetic modifications may also be present in the particles. These may be mixed oxides of silicon dioxide and iron oxide. Iron silicalite (FeSiO$_4$) may be mentioned by way of example. These non-magnetic constituents behave like the non-magnetic silicon dioxide matrix as regards superparamagnetism. In other words the domains remain superparamagnetic, although the saturation magnetisation drops with increasing proportion of the non-magnetic constituents.

In addition iron oxide domains may also be present that on account of their size do not exhibit superparamagnetism and induce a remanence. This leads to an increase in the volume-specific saturation magnetisation. Suitably adapted composite particles can be produced depending on the field of application.

A particularly preferred superparamagnetic iron oxide domain is gamma-Fe$_2$O$_3$ ($\gamma$-Fe$_2$O$_3$), Fe$_3$O$_4$, and mixtures thereof.

Apart from the spatial separation of the superparamagnetic iron oxide domains, the silicon dioxide matrix also has the task of stabilising the oxidation state of the domains. Thus, for example, magnetite is stabilised as superparamagnetic iron oxide phase by a silicon dioxide matrix.

According to a particular embodiment the carbon content of the filler particles may be less than 500 ppm. Particularly preferably the content is less than 100 ppm.

The filler particles may furthermore have a chloride content of 50 to 1000 ppm, originating from the production of the particles. The particles are obtained by a flame pyrolysis process in which chlorine-containing precursors are reacted for example in a hydrogen/oxygen flame. The particles that are formed may contain chlorine for example in the form of oxychlorides from the reaction that has not gone to completion, as well as chlorine in the form of hydrochloric acid. If these compounds are enclosed in the particles that are formed, the chloride content of the particles cannot be reduced further even by purification steps, without the particles being destroyed. The chloride content can be reduced to values of ca. 50 ppm by purification steps.

The filler particles may have different degrees of aggregation depending on the conditions of the flame pyrolysis process. Influencing parameters may include the residence time, temperature, pressure, the partial pressures of the compounds that are used, and the nature and site of the cooling step after the reaction. A broad spectrum ranging from largely spherical to largely aggregated composite particles may thus be obtained.

The BET surface, determined according to DIN 66131, of the filler particles may vary over a wide range from 10 to 600 m$^2$/g. Particularly preferably the range is between 50 and 300 m$^2$/g.

In a preferred embodiment of the composite particles the "blocking temperature", i.e. the temperature below which superparamagnetic behaviour can no longer be detected, may be no more than 150 K. This temperature may depend on, apart from the composition of the particle, also on the size of the superparamagnetic domains and their anisotropy.

The composite particles of superparamagnetic iron oxide and silicon dioxide as filler particles are then reacted on the surface with for example silanes, which may additionally carry groups that can react with the adhesive. In this way the inductively excitable crosslinking agent particles are obtained.

In an advantageous modification of the invention the filler particles are bound via a thermally labile group to the crosslinking agent units. Suitable thermally labile groups are in particular azo groups, carbonate groups or ethylene groups with sterically demanding substituents. When adhesive compositions with such thermally labile groups are heated a bond rupture occurs at a specific temperature, whereby for example nitrogen or carbon dioxide are formed in the examples given above, or the carbon-carbon bond of the ethylene group with sterically demanding substituents is ruptured. A filler particle to which the crosslinking agent units are bound via a thermally labile group is shown for example in FIG. 1B or FIG. 2B, in which the filler particles are present in agglomerated form.

In a variant the adhesive composition, which can be heated by means of an electrical field, magnetic field, electromagnetic field, alternating electrical field, alternating magnetic field or alternating electromagnetic field, contains a polymer, a polymer mixture or a reactive resin, a thermally labile substance, a crosslinking agent component, as well as filler particles that are metallic, ferromagnetic, ferrimagnetic, superparamagnetic or paramagnetic.

Such adhesive compositions are particularly suitable for the production of hardened adhesive joints that are to be re-dissociated by inductive heating.

Adhesive compositions within the meaning of this variant also include in particular adhesives, paints, primers, casting compositions, sealants and laminating resins. All polymers and polymer mixtures that are suitable for the uses mentioned in the introduction may also be regarded as polymers, polymer mixtures and reactive resins within the meaning of this variant. Crosslinked polymers are also preferred for this variant, particularly preferably polymers or reactive resins from which structural or semi-structural joints can be produced. In particular epoxide resins, polyurethanes, acrylates, phenol resins, polysulfides or melamine resins are suitable.

The inductively excitable fillers are present either in the form of singular nanoparticles or aggregates, or in the form of agglomerates. They are preferably found in direct contact with the thermally labile substance, so that the heating takes place selectively at the site at which bonds are to be ruptured. Particularly preferably the thermally labile substance is therefore bound to the inductively excitable fillers. Also preferred are filler particles that carry a silicon dioxide-containing coating. These have a high long-term resistance to moisture.

The crosslinking agent carries functional groups that undergo crosslinking reactions with the polymer, the polymer mixture or the reactive resin, which may be thermally accomplished either inductively or also in a conventional way. Suitable groups that undergo crosslinking reactions include for example epoxide, amino, thiol, alcohol, acrylate, methacrylate or vinyl groups. The adhesive compositions of this variant accordingly have the advantage that, after they are cured, adhesive joints are formed that can be cleanly separated by means of inductive heating, with savings in time and energy. If the filler particles are in direct contact with the thermally labile substance, then the heating is carried out selectively at the site at which the bonds of the thermally labile substance are to be ruptured. This has the advantage that the whole polymer is not destroyed, as would be the case for example if the heating were carried out with a welding torch or laser. A non-selective thermal destruction of the polymer may therefore be avoided.

As thermally labile substances added to the adhesive composition, in particular those substances are suitable that have average particle sizes between 2 nm and 100 μm, preferably between 2 nm and 1 μm and particularly preferably between 2 nm and 200 nm.

Such particles may be present individually or in the form of agglomerates. If adhesive joints that are obtainable by curing such adhesive compositions are heated, then bonds are ruptured or phase transformations take place in these thermally labile substances and the polymer network is destabilised, whereby a rupture of the adhesive joint is possible.

In an advantageous modification the thermally labile substance is a blowing agent that forms a gas under the action of heat, the gas formation temperature being higher than the temperature at which the crosslinking of the adhesive composition starts.

The dissociation of adhesive composites that have been produced from such adhesive compositions is carried out by inductive heating of the particles coupled to the blowing agent, via the decomposition temperature of the blowing agent or of the blowing agent component and the resultant thermal decomposition. The gaseous decomposition products that are formed "blast" the adhesive composite apart. Suitable blowing agents include for example substances that split off water of crystallisation (e.g. aluminium nitrate), organic carboxylic acids (e.g. oxalic acid, glutaric acid), azo compounds (e.g. azodicarbonamide, azoisobutyronitrile), or fluorinated hydrocarbons.

Particularly preferred blowing agents are azodicarbonamide and sulfohydrazides, such as in particular toluene sulfohydrazide and oxygen-bis(benzosulfohydrazide). In general derivatives of azodicarbonamide are also suitable. The blowing agents may optionally be activated with zinc salts. These blowing agents have the advantage that they release a large amount of gas, are sparingly soluble in organic media, decompose at 180° to 200° C., i.e. above the temperature of use of normal bonded joints, and are not toxic. If necessary the decomposition temperature may be reduced by additional activators and thereby adjusted to the conditions under which it is intended to dissociate the adhesive joints. The poor solubility of the aforementioned blowing agents in organic media has the result that the blowing agent is not dissolved in the adhesive and consequently the intimate contact between the inductively heatable filler particles and the blowing agent in the adhesive is retained. In this way the effectiveness of the resin formulation according to the invention is further enhanced.

In a further advantageous modification of the adhesive composition according to the invention collective particles are first of all formed from blowing agent and filler particles, in which the blowing agent may optionally be bound to the filler particles. Collective particles are therefore understood to denote particles that contain both the blowing agent as well as the filler particles. These collective particles are obtained by precipitation, compression, microencapsulation or binding of blowing agents and filler particles with a polymer. The size of such collective particles is limited simply by the subsequent use. Such collective particles have the advantage that inductively heatable blowing agent particles that are readily compatible with the adhesive matrix can be produced. The blowing agent cannot therefore be released by the resin system and the intimate contact between inductively heatable filler particles and the blowing agent is retained.

Preferably the polymer for the formation of the collective particles is expandable polystyrene. The collective particles are accordingly polystyrene beads that contain at the same time the inductively heatable filler particles and a blowing agent that is normally used to expand polystyrene. Such polystyrene beads preferably have a size of 1 μm to 1 mm. When adhesive composites that have been produced from adhesive compositions that contain these polystyrene beads are inductively heated, this leads to an expansion of the polystyrene particles and thus to the dissociation of the adhesive composite.

The adhesive composition according to the invention is preferably used for adhesives, paints, sealants, primers, matrix resins or casting resins.

A process for curing the adhesive composition according to the invention to form adhesive joints consists in inductively heating the adhesive composition by means of an electrical field, magnetic field, electromagnetic field, alternating electrical field, alternating magnetic field or alternating electromagnetic field, to a temperature at which the crosslinking of the adhesive composition starts. This process has the advantage that the duration of the inductive heating is normally in the range from seconds to minutes, and is thus significantly shorter than in the conventional thermal curing processes. Accordingly it is particularly suitable for curing the adhesive compositions according to the invention on sensitive objects. Also, this process is very energy-efficient.

The curing process according to the invention may in particular be carried out as described in Ortwin Hahn, Andrea Kaimann, Adhäsion—Kleben und Dichten, 10/2001, pp. 35 to 38 for adhesive compositions containing coarse particulate fillers. The addition of curing catalysts and activators, as is also described in unpublished specification DE 10127704.0, is advantageous.

The adhesive composite obtained by the process according to the invention for curing the adhesive composition according to the invention contains at least one hardened adhesive layer. In particular such an adhesive composite may be an adhesive joint, a cast structural part, a sealing structural part or a polymer laminate. The cured adhesive layer may be a paint layer or a primer layer.

The process according to the invention for the thermal dissociation of the adhesive composite that can be obtained by curing the adhesive composition according to the invention is carried out by inductively heating the hardened layer of the adhesive composition by means of an electrical field, magnetic field, electromagnetic field, alternating electrical field, alternating magnetic field or alternating electromagnetic field. If the adhesive composition contains the crosslinking agent particles according to the invention, then the hardened layer of the adhesive composition is heated in the process according to the invention to a temperature that lies above the ceiling temperature of the crosslinking points. If the adhesive composition contains filler particles and a thermally labile substance, then the hardened layer of the adhesive composition is heated inductively to a temperature at which the thermally labile bonds of the thermally labile substance or of the thermally labile group rupture.

In the process according to the invention for the thermal dissociation of the hardened adhesive composites, the filler particles are thus inductively heated, whereby a chemical reaction is initiated in which either the thermally labile substances effect a rupture of the crosslinking points of the polymer network due to bond rupture, formation of gas and/or swelling effects, or in which, due to the inductive heating of the filler particles, a bond rupture takes place at the crosslinking points lying in the immediate vicinity of the filler particles.

The dissociation of the adhesive composites according to the invention thus takes place selectively by the action of the high-frequency energy from a conventional induction coil. Due to resultant eddy currents, particle movements in the alternating field and hysteresis losses, the metallic, ferromagnetic, ferrimagnetic, superparamagnetic or paramagnetic filler particles according to the invention present in the polymer network are heated. At the same time there is also a heating of the polymer system in the immediate environment of the filler particles. The induction voltage is chosen so that the heat that is generated is sufficient to dissociate the crosslinking points in the polymer network and to destroy the latter thermally in the case where heating is combined with blowing agents. The induction frequencies are preferably between a few kilohertz and about 35 megahertz. The equipment, parameters and equipment adjustments required in each case depend on the filler that is used and its content in the polymer system. In particular, the particle size distribution, Curie temperature, permeability, electrical resistance, coefficient of thermal expansion and the specific thermal capacity are quantities on which depends the achievable temperature for a specific setting of the equipment. The temperature required for the dissociation depends on the thermal stability of the respective polymer system and blowing agent. If the filler particles that are used are chemically bound to the crosslinking sites of the polymer system, then the filler itself is a constituent of the polymer system. On account of the localised vicinity of the chemical bonds to be separated to the filler particles introduced according to the invention and heatable by induction, the separation is in this case particularly effective.

The process according to the invention for dissociating adhesive composites may be used on bonded joints that consist only of the adhesive itself according to the invention, though there may also be used an adhesive primer based on the adhesive compositions according to the invention in combination with a commercially available adhesive. In this case the dissociation of the composite takes place selectively in the primer layer. The adhesive remains on one of the two bonded parts.

If the adhesive composition according to the invention is a paint that is to be inductively pickled, then in particular adhesive compositions according to the invention are advantageous in which the filler particles are bound to the crosslinking agent component. This has the advantage that no chemicals, no expensive equipment and no high labour expenditure are necessary for the pickling. Furthermore the paints that can be inductively pickled are particularly suitable for sensitive substrates. As examples there may be mentioned fibre-reinforced composite plastics, in which the base polymers are damaged by the pickling chemicals, or the fibres may be exposed or damaged during the grinding. Both phenomena lead to an unallowable weakening of the sensitive structural part.

The process according to the invention for the inductive pickling is suitable in particular for carbon fibre-reinforced structural parts of aircraft or glass fibre-reinforced composites in ships' carcasses and wind power blades.

EXAMPLES OF USE

Without restricting its general applicability, the adhesive composition according to the invention, the process for curing the latter to form an adhesive composite and the dissociation of this adhesive composite are described in more detail hereinafter with the aid of examples of use.

Example 1

Curing and Dissociation of a Bonded Joint with Inductively Excitable Filler Particles Bound to a Crosslinking Agent 1a) Nanoscale Magnetite Coated with Silicon Dioxide 43.3 g of iron(III) chloride hexahydrate are dissolved in 370 ml of water and freed from dissolved oxygen by passing nitrogen through the solution. 15.9 g of iron(II) chloride tetrahydrate are added and a solution of 25.6 g of sodium hydroxide in 100 ml of water is added dropwise within 2 hours, with stirring, with a precision glass stirrer under a flowing stream of nitrogen. A finely particulate black precipitate of $Fe_3O_4$ is thereby formed. A solution of 22 g of $Na_2Si_3O_7$ (annealing loss 17 wt. %) in 80 ml of hot water is then added dropwise within 30 minutes. The silicic acid is now precipitated, with further stirring, by slow dropwise addition of hydrochloric acid (14 ml of 37% hydrochloric acid made up to 50 ml with water). The precipitate is filtered and made into a slurry five times with distilled water and is in each case refiltered in order to separate the sodium chloride formed. The resulting material consists of agglomerated nanoparticles. The primary particles have a diameter of about 8 nm (determined by transmission electron microscopy) and the agglomerates have a diameter of about 400 nm (determined by light scattering).

1b) Modification of the Nanoscale, Inductively Excitable Filler Particles 20 g of the nanoscale magnetite produced according to Example 1a with a residual moisture content of 40% or a comparable material from another source is made into a slurry with acetone, made up to a total volume of 300 ml, acidified with 0.3 ml of conc. hydrochloric acid, following which 15 g of epoxycyclohexyltrimethoxysilane are added. The whole is stirred for 24 hours with a precision glass stirrer and then dried in vacuo on a rotary evaporator. The surface-modified filler carries cycloaliphatic epoxide groups on the surface and is able to act as a crosslinking agent in the adhesive system.

1c) Incorporation of the Surface-Modified Filler into an Adhesive 10 g of 3,4-epoxycyclohexylmethyl-3',4'-epoxycyclohexane-carboxylate, 10 g of cyclohexene oxide, 0.2 g of (tolylcumyl) iodonium tetrakis(pentafluorophenyl) borate and 0.2 g of ascorbic acid-6-hexadecanoate are stirred until a homogeneous mixture is formed (base mixture according to unpublished specification DE 10127704.0). 4 g of the surface-modified filler according to b) are incorporated using a dissolver. After stirring for 15 minutes a homogeneous thixotropic mass has formed, which is used hereinafter as adhesive.

1d) Bonding with Inductive Curing and Re-Dissociation of the Bonded Joint 25 mm-wide and 4 mm-thick parts to be joined consisting of glass fibre-reinforced polyester are bonded with the adhesive produced according to c). For this, a part to be joined is coated in the joining region with a 0.2 mm-thick adhesive layer, the second part is placed thereon, and both parts are fixed under a light pressure (ca. 0.02 N/mm$^2$). The subsequent curing of the adhesive is carried out by excitation with an M230 semiconductor generator from STS. The excitation frequency of this generator is 300 kHz. A coil with three windings and an internal diameter of 3 cm is used for the inductive excitation of the adhesive in the bonded joint. The adhesive surface is aligned in the middle of the coil, perpendicular to the coil axis. The adhesive is cured at an output of 1000 W and an action time of 5 minutes, a firm joint thereby being obtained. This is then dissociated within 60 secs by increasing the generator output to 3000 W. In a comparison example without inductively excitable nanoscale filler particles, it is not possible to cure the adhesive even at an output of 3000 W and an action time of 10 minutes.

Example 2

Bonded Joint that can be Dissociated by an Inductively Excitable Blowing Agent

2a) Formulation from Magnetite Powder and Blowing Agent 20 g of the material produced according to 1a) (residual moisture of the filter cake 40%) or a nanoscale magnetite powder obtained from another source is suspended in 100 ml of ethanol and 20 g of oxy-bis(benzosulfohydrazide) are added as blowing agent. The mixture is heated for 4 hours at 70° C. with stirring, and the solvent is then removed on a rotary evaporator. The dry formulation is ground in a ball mill for 5 minutes and then screened. The fraction with a grain size of nominally less than 63 µm is used for the further tests.

2b) Incorporation of the Formulation from EXAMPLE 2a) in an Adhesive 8 g of 3,4-epoxycyclohexylmethyl-3',4'-epoxycyclohexane-carboxylate, 2 g of poly(tetrahydrofuran) of $M_n$=250, 0.1 g of (tolylcumyl) iodonium tetrakis (pentafluorophenyl) borate and 0.04 g of ascorbic acid-6-hexadecanoate are stirred until the components have dissolved in one another (base mixture according to unpublished specification DE 10127704.0). 2 g of the formulation are then stirred in, whereupon the material assumes a doughy consistency. A part of the sample cures within 30 minutes at 90° C. to form a tack-free polymer.

2c) Bonding and Re-Dissociation of a Plastics Joint 25 mm-wide and 3 mm-thick polypropylene parts to be joined are pretreated by fluorination according to the prior art, coated with a ca. 0.2 mm-thick layer of the inductively excitable formulation, following which a second part is placed thereon and is cured under a light pressure (ca. 0.02 N/mm$^2$) for 30 minutes in an oven at 90° C. The subsequent separation of the joint is carried out by excitation with an M230 semiconductor generator from STS. The excitation frequency of this generator is 300 kHz. A coil with three windings and an internal diameter of 3 cm is used for the inductive excitation of the adhesive in the bond joint. The adhesive surface is aligned in the middle of the coil, perpendicular to the coil axis. With an output of 1500 W and an action time of 25 secs. the blowing agent has decomposed and thereby dissociated the bonded joint. In a comparison example without the nanoscale magnetite powder, the bonded joint cannot be dissociated even under the action of an output of 3000 W for 2 minutes.

The analytical data of the iron oxide-silicon dioxide composite particles used in Examples 3 to 6 are shown in Table 1. The production of these particles is described in DE 10140089.6.

TABLE 1

Analytical data of the iron oxide-silicon dioxide composite particles of Examples 3, 4, 5 and 6

| Use in Example | | 3, 4, 5 | 6 |
|---|---|---|---|
| Iron oxide* | wt. % | 50 | 50 |
| Carbon content | ppm | 70 | <10 |
| Chloride content | ppm | 368 | 635 |
| Saturation magnetisation | $Am^2/kg$ | 17 | 12.5 |
| gamma-$Fe_2O_3$ crystallite size | nm | 10.8 | 15.1 |
| Blocking temperature (ca.) | K | 100 | n.d. |
| BET surface | $m^2/g$ | 146 | 88 |

*Calculated as $Fe_2O_3$; n.d. = not determined

Example 3

Dissociation of a Glass Bond Based on an Adhesive with Inductively Excitable Blowing Agent 3a) Formulation from Composite Particles Produced by Flame Pyrolysis and a Binder 25 g of nanoscale composite particles produced by flame pyrolysis and consisting of silicon dioxide and iron oxide having the properties shown in Table 1 are suspended in 100 ml of ethanol and 20 g of oxy-bis(benzosulfohydrazide) are added as blowing agent. The mixture is heated for 5 hours at 60° C. with stirring, and the solvent is then removed on a rotary evaporator. The dry formulation is ground in a ball mill for 3 minutes and then screened. The fraction with a grain size of nominally less than 63 μm is used for the further tests.

3b) Incorporation of the Formulation from Example 3a) in an Adhesive, and Adhesive Tests 300 g of the moisture-hardening one-component polyurethane adhesive Dinitrol PUR 501 FC (Dinol GmbH) are modified in a Planimax (Molteni) mixer provided with kneading hooks, with 10 g of the formulation produced according to Example 3a and consisting of blowing agent and inductively excitable nanofiller. The mixture is kneaded for 15 minutes at setting 1 (150 rpm) in a dry atmosphere.

A thick layer bond between a sand-blasted and degreased aluminium sheet and a 3 mm-thick float glass panel is prepared using the thereby modified adhesive. The overlap length is 25 mm and the adhesive layer thickness is 3 mm.

After a curing time of 1 week at 25° C. and 50% relative atmospheric humidity the joint is re-separated by inductive excitation. The separation of the joint is carried out by excitation with an M230 semiconductor generator from STS. The excitation frequency of this generator is 300 kHz. A coil with three windings and an internal diameter of 3 cm is used for the inductive excitation of the adhesive in the bonded joint. The adhesive surface is aligned in the middle of the coil, perpendicular to the coil axis. At an output of 3000 W and an action time of 2 minutes the adhesive is destroyed by the expansion of the blowing agent. The two joined parts can easily be separated from one another.

Example 4

Dissociable Bonded Joint Based on an Inductively Dissociable Adhesive Primer 5 g of the formulation prepared according to Example 3a and consisting of blowing agent and inductively excitable nanofiller are stirred into 200 g of the Sika-Primer 206G+P (Sika AG) adhesive primer. The primer is applied to a sand-blasted and degreased aluminium sheet so as to cover the latter. After an aeration time of 1 hour the sheet pretreated in this way is bonded with a 3 mm-thick layer of beech plywood. Sikaflex 254 (Sika AG) is applied as adhesive in a thickness of 3 mm, and the overlap length is 25 mm. The adhesive hardens within 1 week at a relative atmospheric humidity of 50% and at 25° C. The joint is then re-separated by inductive excitation. The excitation of the adhesive for the separation is carried out with an M230 semiconductor generator from STS. The excitation frequency of this generator is 300 kHz. A coil with three windings and an internal diameter of 3 cm is used for the inductive excitation of the adhesive in the bonded joint. The adhesive surface is aligned in the middle of the coil, perpendicular to the coil axis.

At an output of 3000 W and an action time of 2 minutes the adhesive primer applied to the aluminium side is destroyed by the expansion of the blowing agent. The parts of the joint can easily be separated from one another, the adhesive remaining selectively on the plywood.

Example 5

Curing an Elastic Adhesive and Testing the Adhesive Properties

The elastic adhesive Elastosol M83 (Tivoli, Hamburg) is a one-component, heat-curing metal adhesive based on polybutadiene. On the basis of a comparison of the curing in a conventional oven with the inductive curing according to the invention, it will be shown that equivalent bonding results are achieved with both types of curing. In this connection the inductive curing occurs more rapidly.

25 g of the iron oxide-silicon dioxide composite particles according to Table 1 are incorporated in 250 g of the adhesive Elastosol M83 using a Planimax mixer (Molteni) equipped with kneading hooks. Kneading is first of all carried out for 5 minutes at 150 revolutions per minute and then for a further 30 minutes at 450 rpm (setting 3). The mixture is then kneaded for a further 5 minutes in vacuo to degass it (setting 3). The material according to the invention that is thus obtained is used for the adhesive tests.

In order to check the adhesive properties, tensile/shear samples are produced on the basis of DIN EN 1465, one part to be joined consisting of 1.15 mm-thick rolled aluminium sheet material ($AlMg_{0.4}Si_{1.2}$) and another part to be joined consisting of 4 mm-thick, glass fibre-reinforced polypropylene. The aluminium is ground and degreased with butanone. The polypropylene is pretreated in a low-pressure plasma with air as working gas.

Adhesive samples are first of all prepared with the modified adhesive according to the invention and inductively hardened. The curing of the adhesive is carried out by excitation with an M230 semiconductor generator from STS. A water-cooled flat coil with three windings and a diameter of 8 cm is used for the inductive excitation of the adhesive in the bonded joint. The coil is placed on the joined part of polypropylene and the adhesive is cured at an output of 1000 W and an action time of 10 minutes. The samples have a tensile-shear strength of 10.4±0.6 MPa, with a cohesive fracture of the adhesive.

For purposes of comparison, tensile/shear samples are prepared with the unmodified adhesive. In this case the adhesive is cured in a conventional manner according to the manufacturer's instructions. The curing is carried out over 30 minutes at 180° C. in an oven. The tensile-shear strength of these samples is 10.1±0.4 MPa.

Example 6

Modification of a Melt Adhesive for the Selective Dissociation of Bonded Joints

The melt adhesive B40166 (Heinrich Bühnen GmbH) is modified with 7 wt. % of iron oxide-silicon dioxide composite particles according to Table 1 in a Brabender double-screw extruder at a screw speed of 60 rpm and a screw temperature of 220° C. in all heating zones. The melt adhesive is granulated and applied with an HB 500 application device to 5 mm-thick beech plywood. A second piece of beech plywood is immediately pressed onto the melt adhesive. The joint is firm within 1 minute. The dissociation of the bonded joint is carried out inductively with the M230-semiconductor generator from STS and a water-cooled flat coil with three windings and a diameter of 8 cm. The coil is placed on the plywood and an output of 3000 W is adjusted at the semiconductor generator. After an action time of 60 seconds the two plywood plates can be taken apart and, after renewed inductive heating, can be rebonded to one another.

The invention claimed is:

1. Adhesive composition for the production of thermosets, comprising:
   a polymer, a polymer mixture or a reaction resin; and
   crosslinking agent particles;
   wherein:
   the crosslinking agent particles comprise filler particles and crosslinking agent units covalently bound to the filler particles;
   the filler particles are ferromagnetic, ferrimagnetic, superparamagnetic or paramagnetic; and
   the composition can be heated by application of an electrical field, magnetic field, electromagnetic field, alternating electrical field, alternating magnetic field or alternating electromagnetic field; and
   the crosslinking agent units are bound via a thermally labile group to the filler particles.

2. Adhesive composition according to claim 1, wherein the content of crosslinking agent particles is 0.1 wt. % to 80 wt. %.

3. Adhesive composition according to claim 1, wherein the crosslinking agent particles have average primary particle sizes between 2 nm and 1000 nm.

4. Adhesive composition according to claim 1, wherein the crosslinking agent particles have, with respect to their surface, at least 0.00001 mmole×m$^{-2}$ of functional groups with a crosslinking action.

5. Adhesive composition according to claim 1, wherein the filler particles are selected from the group consisting of iron, iron alloys, iron-containing metal oxides, and mixtures thereof.

6. Adhesive composition according to claim 1, wherein the filler particles have a core-shell structure and are produced by sol-gel processes or from the reaction of nanoscale iron oxide with sodium silicate.

7. Adhesive composition according to claim 1, wherein the filler particles are superparamagnetic iron oxide-silicon dioxide composite particles produced by flame pyrolysis.

8. Adhesive composition according to claim 1, wherein the thermally labile group is an azo or a carbonate group.

9. Adhesive composition for the production of thermosets according to claim 1, wherein said adhesive further comprises a thermally labile substance in addition to the cross-linking agent particles.

10. Adhesive composition according to claim 9, wherein the thermally labile substance has average particle size between 2 nm and 100 μm.

11. Adhesive composition according to claim 9, wherein the thermally labile substance is a blowing agent that forms gas under the action of heat, in which the gas formation temperature is higher than the temperature at which the crosslinking of the adhesive composition starts.

12. Adhesive composition according to claim 11, wherein the blowing agent comprises at least one member selected from the group consisting of an azodicarbonamide and a sulfohydrazide.

13. Adhesive composition according to claim 11, wherein collective particles are included that contain the blowing agent and the filler particles and are obtainable by precipitation, compression, microencapsulation or bonding of blowing agent and filler particles with a polymer.

14. Adhesive composition according to claim 13, wherein the polymer for the formation of the collective particles is expandable polystyrene.

15. A method of applying the adhesive composition according to claim 1, comprising applying the composition to a substrate.

16. Process for curing the adhesive composition according to claim 1, comprising:
   inductively heating the adhesive composition by means of an electrical field, magnetic field, electromagnetic field, alternating electrical field, alternating magnetic field or alternating electromagnetic field to a temperature at which the crosslinking of the adhesive composition starts.

17. Process for thermal dissociation of an adhesive composite obtained by curing the adhesive composition according to claim 1, the process comprising:
   heating a hardened layer of the adhesive composition by means of an electrical field, magnetic field, electromagnetic field, alternating electrical field, alternating magnetic field or alternating electromagnetic field to a temperature that lies above a ceiling temperature of the crosslinking points.

18. Process for thermal dissociation of an adhesive composite obtained by curing the adhesive composition according to claim 1, the process comprising:
   heating a hardened layer of the adhesive composition by means of an electrical field, magnetic field, electromagnetic field, alternating electrical field, alternating magnetic field or alternating electromagnetic field to a temperature at which thermally labile bonds of a thermally labile substance and/or thermally labile group rupture.

19. Process according to claim 17, wherein the adhesive composite is provided in a paint composition.

20. Process according to claim 19, wherein the paint composition is provided on a substrate employed in aircraft construction for shipbuilding.

* * * * *